(12) United States Patent
Nowicki et al.

(10) Patent No.: US 9,394,806 B2
(45) Date of Patent: Jul. 19, 2016

(54) GUIDE APPARATUS FOR TURBOMACHINES

(75) Inventors: Peter Nowicki, Weingarten (DE);
Christof Abele, Ravensburg (DE);
Klaus Kuhn, Ravensburg (DE)

(73) Assignee: ANDRITZ HYDRO GMBH, Vienna (AT)

( * ) Notice: Subject to any disclaimer, the term of this patent is extended or adjusted under 35 U.S.C. 154(b) by 702 days.

(21) Appl. No.: 13/819,861

(22) PCT Filed: Aug. 19, 2011

(86) PCT No.: PCT/AT2011/000350
§ 371 (c)(1),
(2), (4) Date: Apr. 29, 2013

(87) PCT Pub. No.: WO2012/027766
PCT Pub. Date: Mar. 8, 2012

(65) Prior Publication Data
US 2013/0216353 A1      Aug. 22, 2013

(30) Foreign Application Priority Data

Aug. 30, 2010  (AT) ................. A 1446/2010

(51) Int. Cl.
*F01D 17/16* (2006.01)
*F01D 25/00* (2006.01)
*F03B 3/18* (2006.01)

(52) U.S. Cl.
CPC ............... *F01D 25/00* (2013.01); *F01D 17/16* (2013.01); *F03B 3/183* (2013.01); *F05B 2260/3011* (2013.01); *F05B 2260/506* (2013.01); *F05B 2260/79* (2013.01); *Y02E 10/223* (2013.01)

(58) Field of Classification Search
CPC ....... F01D 17/14; F01D 17/16; F01D 17/162;
F01D 17/165; F01D 21/04; F01D 21/045;
F01D 25/00; F03B 3/183; F05B 2260/301;
F05B 2260/506; F05B 2260/79
See application file for complete search history.

(56) References Cited

U.S. PATENT DOCUMENTS

| 1,543,050 | A |   | 6/1925 | Benson |
| 1,585,862 | A |   | 5/1926 | Jessop |
| 2,084,369 | A | * | 6/1937 | Young .................... F03B 3/183 251/228 |

(Continued)

FOREIGN PATENT DOCUMENTS

| CH | 228733 | 9/1943 |
| CH | 444 787 | 9/1967 |
| CN | 201025220 | 2/2008 |

(Continued)

*Primary Examiner* — Igor Kershteyn
*Assistant Examiner* — Christopher R Legendre
(74) *Attorney, Agent, or Firm* — Nixon & Vanderhye P.C.

(57) ABSTRACT

The invention relates to a guide apparatus for turbomachines, in particular for Francis or Kaplan turbines or pumps or pump turbines having a plurality of guide blades which can be actuated via in each case one link on a common adjusting member. Here, every guide blade or every second guide blade can be equipped with a bending element. A bending-failure link can have a screw connection and a bending body element. The screw connection is prestressed and is configured with a defined fracture cross section. The triggering force on the bending-failure link and the holding force after a fracture of the bending element can therefore be selected independently of one another. The guide blades are protected against damage by foreign bodies in the guide apparatus.

9 Claims, 1 Drawing Sheet

(56) References Cited

U.S. PATENT DOCUMENTS

| | | | | |
|---|---|---|---|---|
| 4,040,766 | A | * | 8/1977 | Sekido ................ F03B 3/183 415/155 |
| 6,398,483 | B1 | * | 6/2002 | Conete ................ F01D 17/162 415/130 |
| 2013/0216353 | A1 | * | 8/2013 | Nowicki ............... F03B 3/183 415/9 |

FOREIGN PATENT DOCUMENTS

| | | |
|---|---|---|
| CN | 101666282 | 3/2010 |
| CN | 201461199 | 5/2010 |
| DE | 1 503 299 | 9/1969 |
| DE | 2 134 559 | 1/1972 |
| GB | 989 828 | 4/1965 |
| JP | 8-74725 | 3/1996 |

* cited by examiner

GUIDE APPARATUS FOR TURBOMACHINES

RELATED APPLICATION

This is a U.S. National Phase of PCT/AT2011/000350 having an international filing date of Aug. 19, 2011, which designated the U.S and claims priority to Austrian application no. A 1446/2010 filed Aug. 30, 2010, the entirety of each of these applications are incorporated by reference.

BACKGROUND

The present invention relates to a guide vane assembly for continuous-flow machines, particularly for Francis or Kaplan turbines and for pumps or pump turbines, with a plurality of guide vanes actuated by one link each on a common adjusting element, where safety elements are provided.

Adjusting elements are known on guide vane assemblies in which each or every second transmission mechanism has a safety element that limits the torque transmitted to the guide vanes during a closing operation. These safety elements are intended to prevent the full torque that the actuating device can apply to the common adjusting element being concentrated on the vanes that are prevented from closing when a solid body is trapped accidentally between two adjacent vanes, which could cause damage to the vanes or the adjusting element. The safety elements of this kind in use include shear pins or tension shear pins, which break before reaching the maximum permitted torque is exceeded and release the vane from the bracing at the same time. An adjusting device of this kind is shown in CH 444 787, for example. Other existing safety elements are articulated and bending links (e.g. JP 8074725 A), repositioning safety elements with spring elements (e.g. GB 0989828 A), and hydraulic systems (e.g. DE 1503299 A1).

SUMMARY

An aim of the present invention is to avoid the disadvantages of the known safety elements and guarantee a simple, low-cost, precise, and safe connection between guide vane and adjusting element.

A bending-breaking link is used as a safety element, where the safety element can have a bending element and a screw connection. An innovation is provided by the combination of bending and breaking as safety element.

A favorable configuration is the screw connection being surrounded by a sleeve.

A favorable further development is a pre-stressed tension bolt with a pre-defined rupture cross-section being provided as screw connection. By combining a ductile material that changes its shape with a brittle, high-strength material that breaks, a tripping characteristic is obtained that is highly suitable for overload protection devices. With the embodiment described, damage can be prevented to the guide vane and the adjusting device or to the mechanical regulating system on the one hand, and on the other hand, this embodiment prevents adjacent guide vanes being affected as well.

SUMMARY OF DRAWINGS

The present invention is now described on the basis of examples shown in the drawings, where.

DETAILED DESCRIPTION

Figure 1:
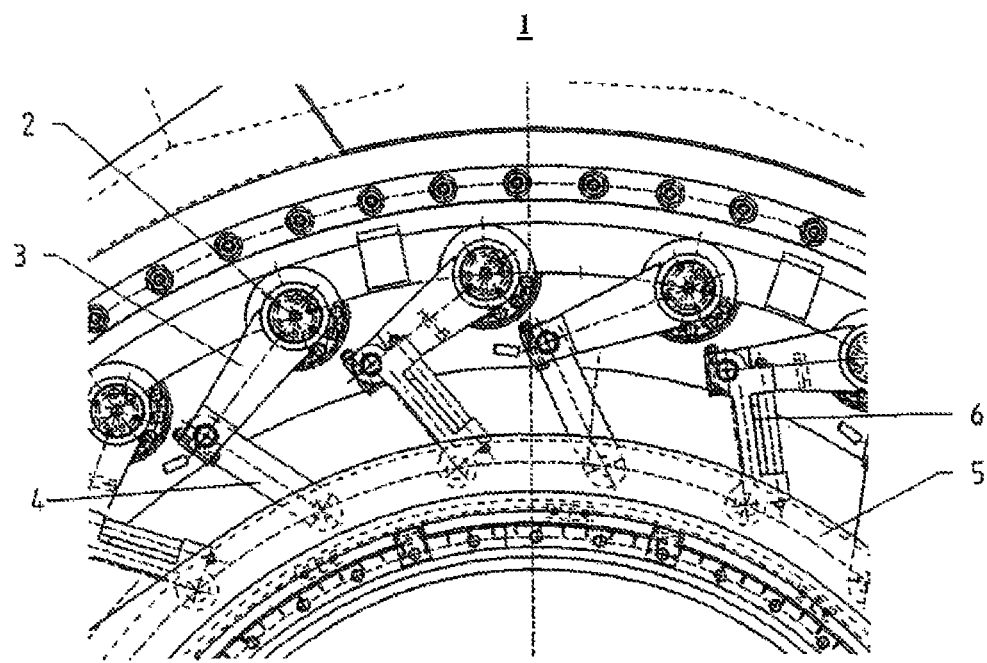
FIG. 1 shows the guide vane assembly of a Francis turbine with bending-breaking links according to the invention and FIG. 2 provides a detailed illustration of a bending-breaking link according to the invention.

FIG. 1 shows a section of a guide vane assembly 1 for a Francis turbine. The axes 2 of the guide vanes, which are secured via a guide vane lever 3 and a link 4 with an articulated connection to the lever on the regulating or adjusting ring 5, are visible here. All of the guide vanes are thus adjusted evenly via their axes 2 by turning the adjusting ring 5. In one final position, the guide vanes also serve as shut-off valves. As foreign particles can enter the turbine and the guide vane assembly in the water flow, there is a risk of a foreign particle being trapped in the guide vane assembly and preventing the guide vanes from closing. If there are no safety elements available, the pair of guide vanes concerned will be damaged during the closing operation. The safety element guarantees that the other guide vanes in the turbine can close safely, even if one pair of guide vanes is prevented from doing so due to a foreign particle being trapped between them. The jammed guide vane with safety element is excluded from the overall movement of the guide vane assembly 1 when a defined force is exceeded and is thus protected against any damage. In the present example, only the transmission mechanism of every second guide vane is fitted with the bending-breaking link 6 according to the invention. The transmission mechanism of the guide vanes in between continues to have a non-yielding link 4.

The invention is not limited to the example presented. For example, it is also possible to design each link 4 as a bending-breaking link 6.

Figure 2:
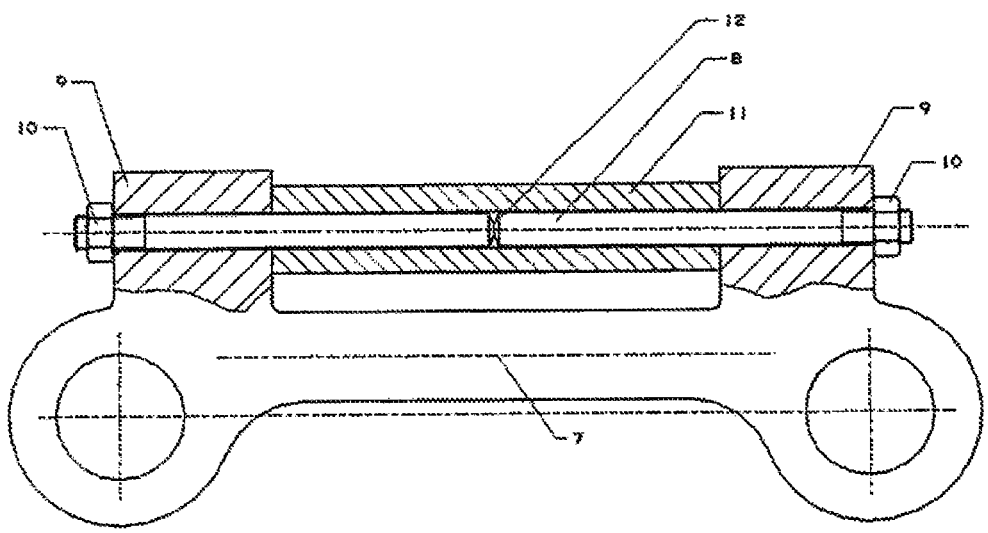

FIG. 2 shows a bending-breaking link 6 according to the invention. The bending-breaking link 6 consists of a bending element (bending profile) 7, which is connected to the lever 3 of the guide vane on the one hand and to the adjusting ring 5 on the other hand. A screw connection serves as stiffening. This screw connection consists of a pre-stressed tension bolt 8, which is screwed in between two flanks 9 and secured with nuts 10. In the area between the two flanks 9, the tension bolt 8 is surrounded by a sleeve 11. The combination of bending element 7 and screw connection is able to transmit the required positioning forces. The tripping force of the bending-breaking link 6 is defined by the rupture cross-section 12 of the pre-stressed tension bolt 8. The rupture cross-section 12 in this case is approximately in the middle of the tension bolt, however it can also be located at the transition from sleeve 11 to flank 9 for example. If there is a break in the link, the guide vane is held by the bending element 7. This prevents the guide vane from moving entirely freely in the flow. The safety element suffers no permanent deformation until the overload limit is reached because the combination of screw connection and bending element 7 results in a very high moment of inertia. When the loading limit is exceeded, the tension bolt 8 breaks at the rupture cross-section 12, the moment of inertia of the bending-breaking link 6 drops dramatically, and the load on the guide vane is relieved immediately. This provides a decisive advantage over a simple bending link, as described in JP 8074725 A for example. A simple bending link has an unfavorable tripping characteristic because a bending link is not triggered at a defined point. This is due to the load-bearing reserve that is present during the bending operation. In the invention, the tripping force at the bending-breaking link 6 and the holding force after the tension bolt 8 breaks can be selected independently of one another through the dimensioning of the rupture cross-section 12 and the cross-section of the bending element 7. The tripping force is not dependent on the ratio between the critical compressive force and the fitting length. The bending-breaking link 6 can thus also be used for Francis turbines, where an articulated element cannot be used because of the lack of effective length.

The bending-breaking link 6 does not disperse the tripping force to the same extent as shear pin or articulated links. This is guaranteed by triggering via a pre-stressed screw connection and by the lower friction influence of the bearings (on the adjusting ring 5 and the guide vane link 3) as a result of the greater eccentricity at the bending body 7 and tension bolt 8. The calculation uses stable computation models and thus also contributes to very low dispersion of the tripping force. In comparison, articulated links are very difficult to dimension as safety elements due to their unstable failure. Dispersion of the tripping forces is correspondingly high. As the dispersion of tripping forces is low at the bending-breaking link 6, a lower tripping force can be selected while providing the same degree of safety. The remaining guide vane assembly components can be sized down as a result. The bending-breaking link 6 according to the invention is well suited for turbines and pump turbines with a high dynamic load. Due to the pre-stressed tension bolt 8, the load at the rupture cross-section 12 is reduced and the fatigue strength problems are diminished. The bending-breaking link 6 is a simple and low-cost component. It can be replaced very easily after being triggered, also in installed turbines or pump turbines, because the adjusting device is mounted outside on the turbine cover.

The invention claimed is:

1. A guide vane adjustment assembly for inlet guide vanes on a continuous flow water pump or turbine, the assembly comprising:
    a lever for each of the inlet guide vanes, wherein each lever extends from a pivot axis of the corresponding inlet guide vane and is configured to turn the vane about the pivot point;
    a common adjusting element configured to pivot the levers;
    links extending between the levers and the common adjusting element, wherein each link couples a corresponding one of the levers to the common adjusting element;
    at least one of the links includes a first arm and a bending element arm, wherein each first arm and bending element arm extend between a coupling of the respective link to the respective lever and a coupling of the respective link to the common adjusting element, wherein each bending element arm includes a rupture region configured to rupture when a bending moment applied to the respective link is above a threshold level, and wherein each first arm is configured to withstand the threshold moment without rupturing.

2. The guide vane assembly of claim 1 wherein each first arm and bending element arm are fixed together in the respective link, and each first arm and bending element arm are respectively parallel and offset from a line extending through a pivoting coupling of the respective link to the respective lever and a pivoting coupling of the respective link to the common adjusting element.

3. The guide vane assembly of claim 1 wherein the pivot axes of the inlet guide vanes are arranged in a circle and the common adjusting element includes a ring coaxial to the circle, and each link is included in an annular array of links.

4. The guide vane assembly of claim 1 wherein the pump or turbine is at least one of a Francis turbine, a Kaplan turbine, a pump and a pump turbine.

5. The guide vane assembly of claim 1 wherein each bending element arm includes a shaft having the respective rupture region and each shaft is placed under tension to achieve the configuration of the respective bending element.

6. The guide vane assembly of claim 5 further comprising a sleeve over the respective shaft.

7. The guide vane assembly according to claim 1 wherein each bending element arm includes a shaft having a threaded end engaging a threaded aperture in the respective link.

8. The guide vane assembly according to claim 1 wherein the rupture region of the respective bending element arm has a narrowed cross-sectional area.

9. A link in a guide vane adjustment assembly for inlet guide vanes on a continuous flow water pump or turbine and actuated by a common adjusting element, the link comprising:
    a first pivot coupling connecting a first end region of the link to a lever on the respective inlet guide vane;
    a second pivot coupling connecting a second end region of the link to the common adjusting element;
    a first arm extending between the first pivot coupling and the second pivot coupling, wherein the first arm is offset in a first direction from a line extending through the first pivot coupling and the second pivot coupling; and
    a bending element arm extending between the first pivot coupling and the second pivot coupling, wherein the bending element arm is offset in the first direction from the line extending through the first pivot coupling and the second pivot coupling, wherein the bending element arm includes a rupture region configured to rupture when a bending moment applied to the link is above a threshold moment, and wherein the first arm is configured to withstand the threshold moment without rupturing.

* * * * *